United States Patent
Toebes et al.

(10) Patent No.: US 9,172,799 B2
(45) Date of Patent: Oct. 27, 2015

(54) METHOD AND APPARATUS FOR DISPLAYING A SOCIAL NETWORKING STATUS MESSAGE ON A DIALING PHONE

(75) Inventors: Mary Ellen Toebes, Cary, NC (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 12/824,478

(22) Filed: Jun. 28, 2010

(65) Prior Publication Data

US 2011/0319057 A1     Dec. 29, 2011

(51) Int. Cl.
*H04M 3/42*  (2006.01)

(52) U.S. Cl.
CPC .... *H04M 3/42374* (2013.01); *H04M 2203/655* (2013.01)

(58) Field of Classification Search
USPC ....................... 455/412.2, 415, 412
See application file for complete search history.

(56) References Cited

U.S. PATENT DOCUMENTS

| | | | |
|---|---|---|---|
| 7,076,043 B2 | 7/2006 | Curbow et al. | |
| 7,474,741 B2 | 1/2009 | Brunson et al. | |
| 7,620,160 B2 | 11/2009 | Tidwell et al. | |
| 2008/0037729 A1 | 2/2008 | Mobin et al. | |
| 2008/0045184 A1* | 2/2008 | Randall et al. | 455/412.2 |
| 2010/0208746 A1 | 8/2010 | Rahman | |
| 2010/0228826 A1 | 9/2010 | Marlow et al. | |
| 2010/0285780 A1* | 11/2010 | Collins | 455/414.1 |
| 2011/0274260 A1* | 11/2011 | Vaananen | 379/93.23 |

* cited by examiner

*Primary Examiner* — Charles Appiah
*Assistant Examiner* — Randy Peaches
(74) *Attorney, Agent, or Firm* — P. Su

(57) ABSTRACT

In one embodiment, a method includes identifying when a call to a callee has been initiated by a system. Once the call is identified as being initiated, status information associated with the callee is obtained. The status information is then displayed on the system.

14 Claims, 8 Drawing Sheets

METHOD AND APPARATUS FOR DISPLAYING A SOCIAL NETWORKING STATUS MESSAGE ON A DIALING PHONE

BACKGROUND

The disclosure relates generally network communications, and more particularly to enhancements for telephonic communications Phone calls are often placed to parties who are unable to answer the phone calls. For example, a person who is at a theater attending a performance is unlikely to answer a phone call. Unless a caller who wishes to contact the person is aware that the person is unlikely to answer a phone call, the caller is very likely to initiate a phone call to the person. However, if the caller is aware that the person is at a theater, he or she may decide not to initiate a phone call.

A caller who wishes to contact a person using a phone may consult any number of sources of information in an effort to determine whether the person is likely to answer a call, or why the person did not answer a call. As many people maintain status information on social network websites, a caller may wish to check the status of the person on social network websites. By way of example, if a caller sees that the status of a person is listed as "Mary Ellen is going to the theater tonight" on a social network website, the caller may decide not to place a call to the person because he or she is aware that someone at a theater is unlikely to answer a call.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes identifying when a call to a callee has been initiated by a system, obtaining status information associated with the callee when the call is identified as being initiated, and displaying the status information on the system. In one embodiment, the status information is social network status information, and obtaining the status information includes obtaining the social network status information from a social network site.

Description

Social network status information is readily available. Many individuals subscribe to social networks, e.g., Facebook and Twitter, and update their statuses regularly on the social networks. Thus, status information relating to individuals is often both readily available and up-to-date. Such status information may generally be useful in providing a person who is about to dial or place a call, e.g., a caller, with an indication of whether the target of the call, e.g., a callee, is likely to answer the call. For example, a caller may access a social network to obtain a relatively recent status of a callee. Using the recent status of the callee, a caller may determine whether a callee would be likely to answer a call and, therefore, whether the caller wants to proceed with placing a call to the callee.

Status information of a callee may be substantially delivered to a caller when the caller dials or otherwise initiates a call to the callee. Status information, e.g., social network status information, associated with a callee may be displayed on a display screen of a dialing phone after the dialing phone is used to initiate a call to the callee. By providing a caller with status information associated with a callee when the caller initiates a call to the callee, the caller may make an intelligent decision regarding whether to continue with the call. For example, status information may indicate that a callee is not likely to answer a call, in which case the caller may decide to contact the callee using another method. In addition providing a caller with status information associated with a callee may provide the caller with valuable information relating to the current activities of the callee.

In one embodiment, a call server that is accessed by a caller in order to initiate a call to a callee may be arranged to obtain social network status information associated with the callee, and to provide such information to the caller. In another embodiment, a system associated with a callee may be arranged to obtain social network status information associated with the callee, and to provide such information to a caller. In still another embodiment, a system associated with a caller may be arranged to obtain social network status information associated with the callee, and to substantially display such information.

Figure 1:
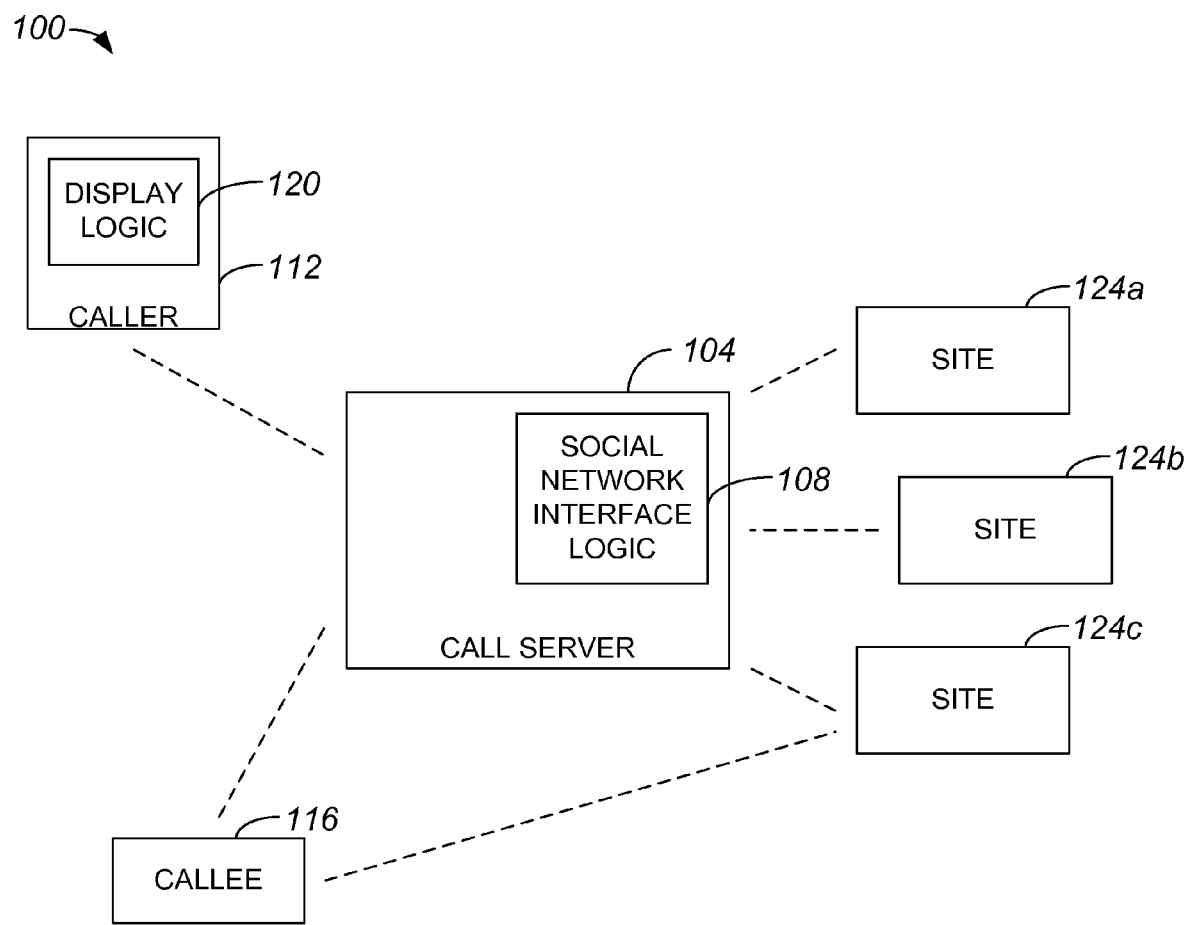
FIG. 1 is a block diagram representation of a network in which a call server provides a caller with social network status information relating to a callee in accordance with an embodiment.

Referring initially to FIG. 1, a network in which a call server provides a caller with social network status information relating to a callee will be described in accordance with an embodiment. A network 100, which may be any suitable communications network, includes a call server 104 which effectively manages calls within network 100. Network 100 also includes a caller 112, a callee 116, and a plurality of sites 124a-c, e.g., social network sites.

Caller 112 is arranged to initiate a call to callee 116 through call server 104. Caller 112 may generally be associated with, e.g., include, a system such as a computing system or a telephone that includes display logic 120. Display logic 120 is configured to display or, more generally, to present a social network status associated with callee 116.

Call server 104 includes social network interface logic 108. Social network interface logic 108 is arranged to obtain social network status information relating to callee 116, and to provide the social network status information to caller 112 such that the social network status information may be displayed using display logic 120. In one embodiment, social network interface logic 108 obtains social network status information relating to callee 116 from at least one site 124a-c. It should be appreciated, however, that social network interface logic 108 may instead obtain social network status information from callee 116, e.g., from a cache (not shown) associated with callee 116.

Like caller 112, callee 116 may also generally be associated with, e.g., include, a system such as a computing system or a telephone. Callee 116 is arranged to interact with sites 124a-c to provide status information to sites 124a-c. In other words, callee 116 provides sites 124a-c with status information that may be obtained by social network interface logic 108.

Figure 2:
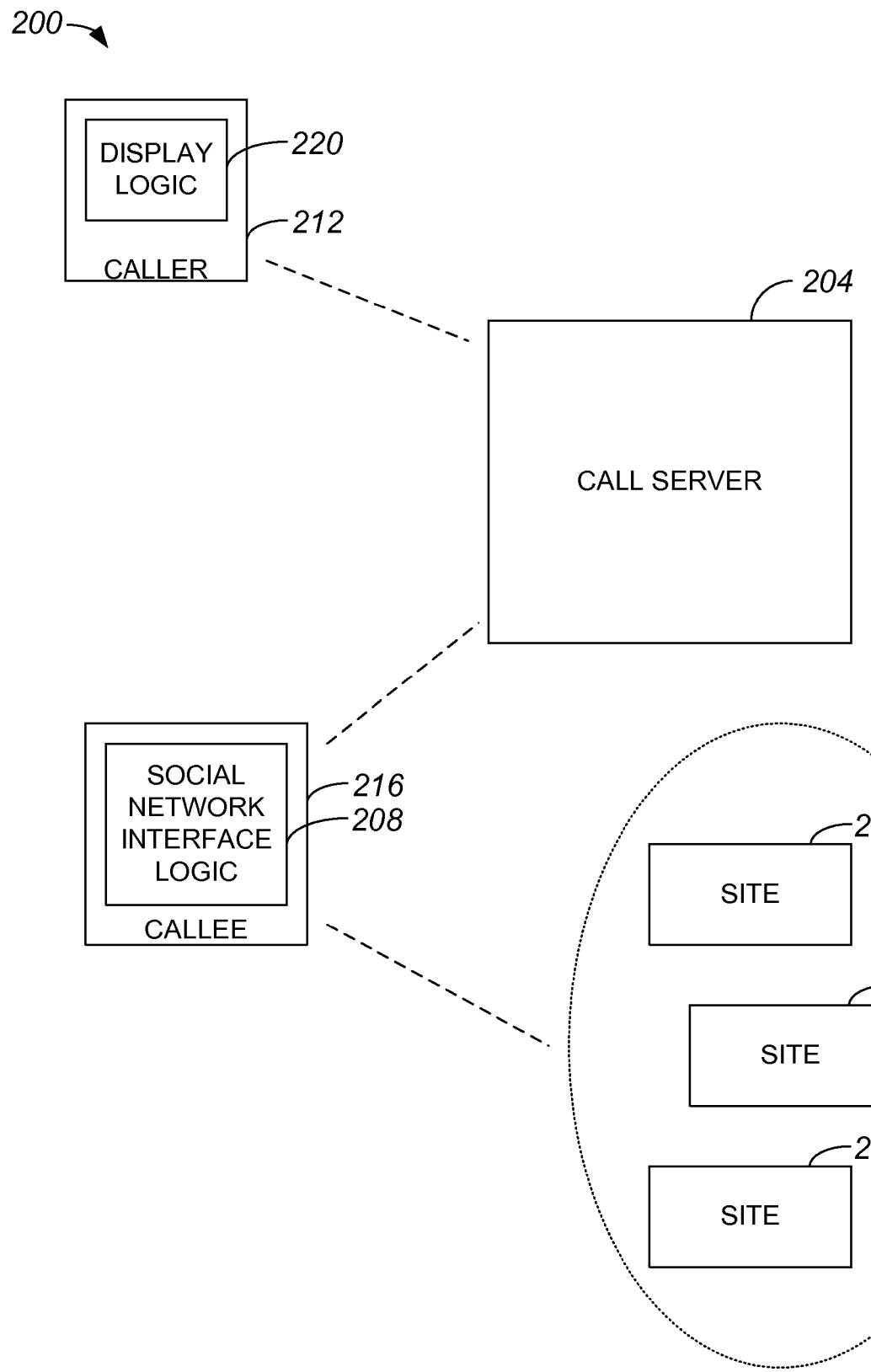
FIG. 2 is a block diagram representation of a network in which a callee provides a caller with social network status information relating to the callee in accordance with an embodiment.

In lieu of social network interface logic being included on a call server, social network interface logic may instead be included on a system associated with a callee. FIG. 2 is a block diagram representation of a network in which social network interface logic is associated with a callee such that the callee provides a caller with social network status information relating to the callee in accordance with an embodiment. A network 200 includes a call server 204 which effectively manages calls within network 200, a caller 212, a callee 216, and a plurality of sites 224a-c, e.g., social network sites.

Caller 212 is arranged to initiate a call to callee 216 through call server 204. Caller 212 is associated with, e.g., includes, display logic 220 that is configured to display a social network status associated with callee 216.

Callee 216 is arranged to interact with sites 224a-c to provide status information to sites 224a-c. Callee 216 includes social network interface logic 208 arranged to obtain social network status information relating to callee 216, and to provide the social network status information to caller 212 such that the social network status information may be displayed using display logic 220. Social network status information may be provided directly to caller 212 or indirectly to caller 212, e.g., through call server 204, by social network interface logic 208. Social network status information may generally be provided using any suitable method including, but not limited to including, sending an SMS message from a callee to a caller which includes the social network status or a pointer to where the caller may obtain the status. Social network interface logic 208 may also provide social network information through a return status from a server, e.g., in a response to a SIP invite. In one embodiment, social network interface logic 208 obtains social network status information relating to callee 216 from at least one site 224a-c. It should be appreciated, however, that social network interface logic 208 may instead obtain social network status information from a local source, e.g., from a cache (not shown) associated with callee 216.

Figure 3:
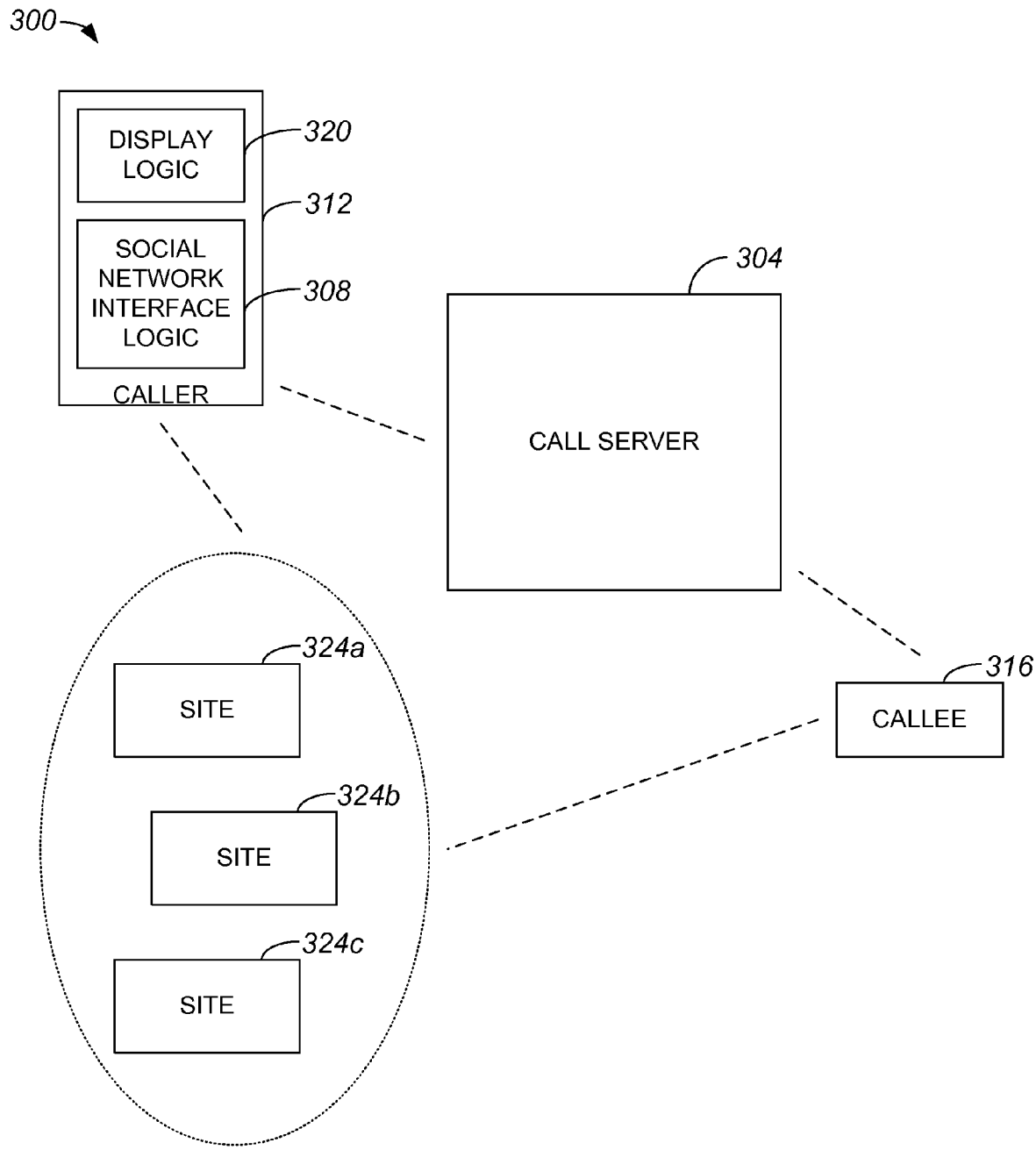
FIG. 3 is a block diagram representation of a network in which a caller is arranged to obtain social network status information relating to a callee substantially directly from social networking sites in accordance with an embodiment.

Rather than being located on a call server or a system associated with a callee, social network interface logic may be located on a system associated with a caller. FIG. 3 is a block diagram representation of a network in which social network interface logic that is arranged to obtain social network status information relating to a callee is located on a system associated with a caller in accordance with an embodiment. A network 300 includes a caller 312, a call server 304, a callee 316, and a plurality of sites 324a-c, e.g., social network sites.

Caller 312, which is arranged to initiate a call to callee 316 through call server 304, is associated with, e.g., includes, a system that has display logic 320 and social network interface logic 308. Display logic 320 is configured to display a social network status associated with callee 316, once the social network status is obtained by social network interface logic 308. Social network interface logic 308 is arranged to obtain social network status information associated with callee 316. Social network interface logic 308 may be arranged to map phone numbers to social network addresses such that social network status information may be obtained. As shown, social network status information associated with callee 316 is obtained substantially directly from sites 324a-c, which are updated by callee 316. It should be appreciated, however, that social network status information is not limited to being obtained substantially directly from sites 324a-c. For example, social network status information may be obtained from callee 316 or from a cache (not shown) on caller 312 in which social network status information relating to callee 316 may be stored.

Figure 4:
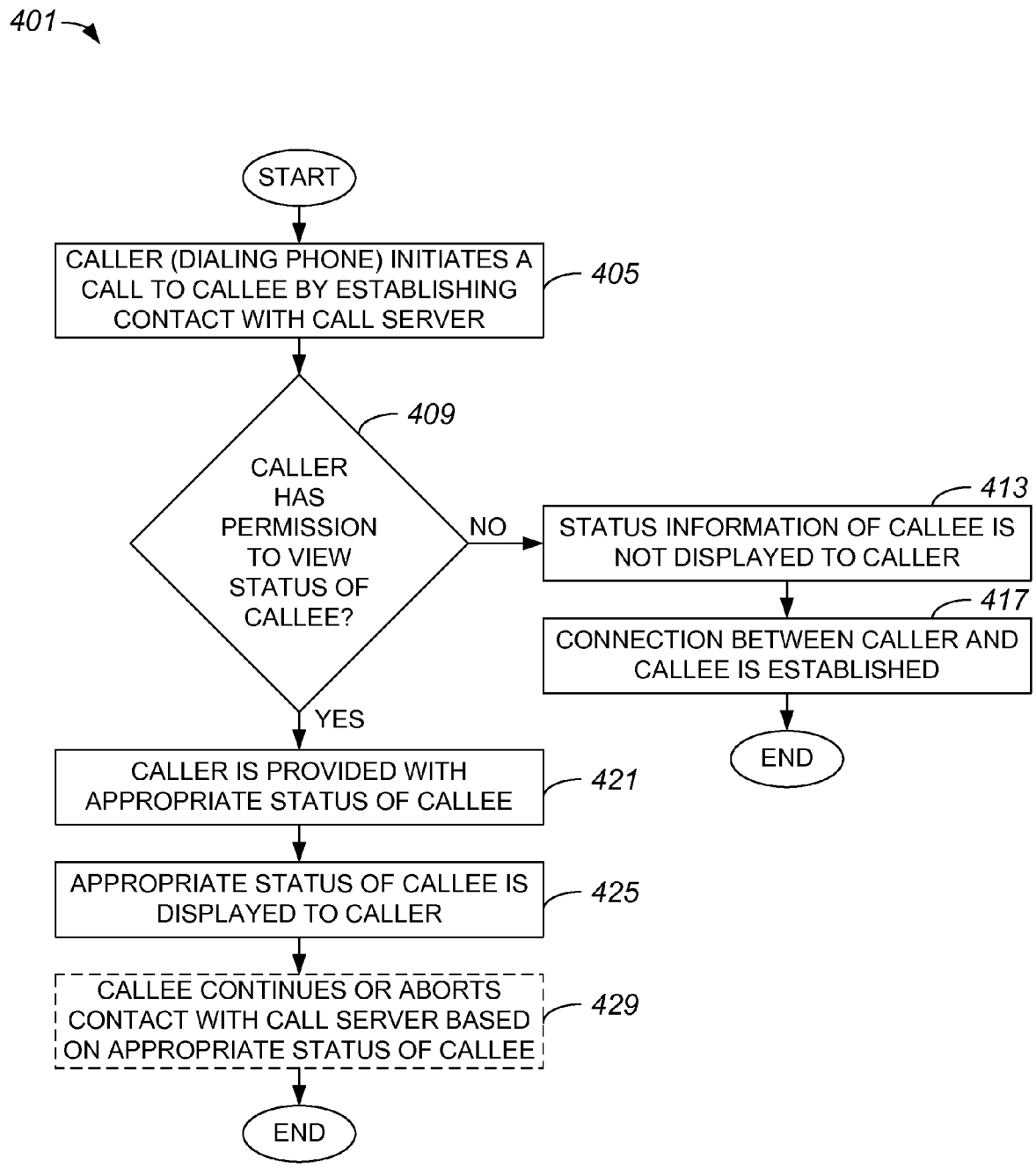
FIG. 4 is a process flow diagram which illustrates a general method of displaying a social network status message on a dialing phone within a network in which social network interface logic is not located on the dialing phone in accordance with an embodiment.

As described above with respect to FIGS. 1 and 2, social network logic may be located on a call server or on a system associated with a callee. Thus, social network information relating to a callee may be provided to a caller when the caller effectively calls into a call server. With reference to FIG. 4, a general method of displaying a social network status message to a caller, e.g., on a phone used to initiate a call to a callee, within a network in which social network interface logic is not located on the phone used to initiate the call will be described in accordance with an embodiment. A method 401 of displaying a social network status message to a caller begins at step 405 in which a caller, through the use of a dialing phone, initiates a call to a callee. Initiating a call to a callee may include dialing a phone number of the callee, and establishing contact with a call server substantially as a result of dialing the phone number of the callee.

Once the caller establishes contact with the call server, it is determined in step 409 whether the caller has permission or authorization to view a status of the callee. For purposes of illustration, it is assumed that the callee subscribes to at least one social network site. It should be appreciated, however, that a callee may not necessarily subscribe to any social network sites.

If the determination in step 409 is that the caller does not have permission to view the status of the callee, the implication is that the callee has not authorized the caller to view the status of the callee. As such, process flow moves from step 408 to step 413 in which the status information of the callee is not displayed to the caller. In one embodiment, a message indicating that the caller is not authorized to view the status of the callee may be displayed. In step 417, a connection between the caller and the callee is established, and the method of displaying a social network status message is completed. The connection that is established may lead to the caller and the callee engaging in a phone call, or may lead to the caller being routed to a voice mailbox associated with the callee.

Returning to step 409, if the determination is that the caller has permission to view the status of the callee, the caller is provided with an appropriate status of the callee in step 421. Providing the caller with the appropriate status may include identifying the appropriate status, and then transmitting the appropriate status to the caller, as for example on a connection with the caller or through an SMS message. In one embodiment, the caller may be provided with the appropriate status substantially in-band, e.g., in an SMS message, or substantially out-of-band, e.g., in a message sent through a data network. The appropriate status may be provided by a call server if the social network interface logic is embodied on the call server, or the appropriate status may be provided by the callee if the social network interface logic is embodied with respect to the callee, e.g., on a phone associated with the callee.

The appropriate status of the callee may be a most recent status of the callee. In one embodiment, if a callee is subscribed to multiple sites, the appropriate status of the callee may be determined using any suitable metric. Such a metric may be based on policies that specify how an appropriate status is to be selected if there is more than one status available. Policies may vary widely and may, for example, result in the appropriate status being a most recent status or a most relevant status.

After the caller is provided with the appropriate status of the callee, the appropriate status of the callee is displayed to the caller in step 425. Then, in an optional step 429, the callee may either establish contact with the callee or may abort contact with the call server based on the appropriate status of the callee. For example, if the appropriate status of the callee indicates that the callee is not likely to be able to answer a call, the caller may elect to abort attempting to contact the callee. The process of displaying a social network status message is completed after the status of the callee is displayed to the caller, or after the caller optionally establishes contact with the callee or aborts attempting to contact with the callee.

Figure 5:
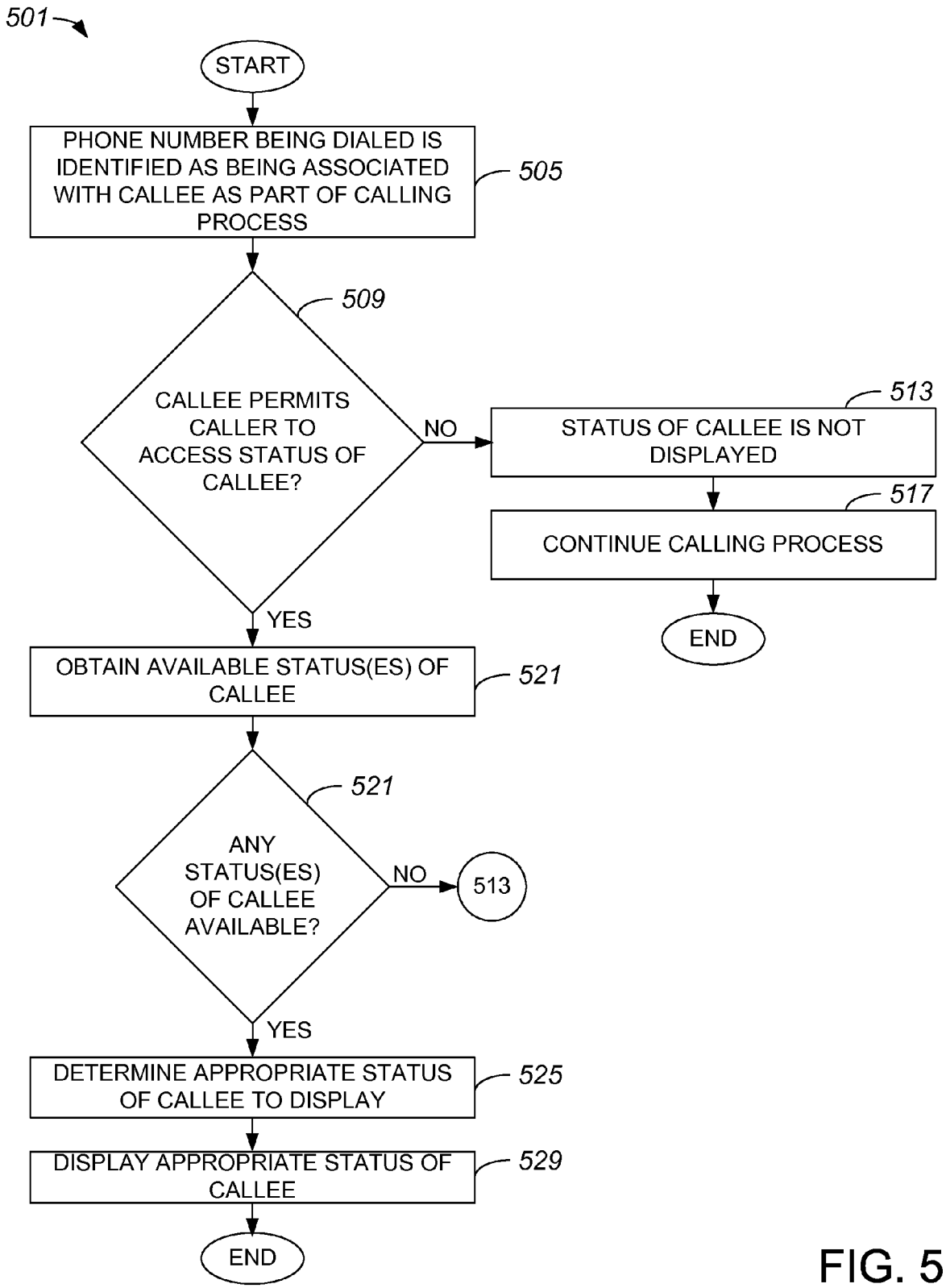
FIG. 5 is a process flow diagram which illustrates a general method of displaying a social network status message on a dialing phone within a network in which social network interface logic is located on the dialing phone in accordance with an embodiment.

In lieu of social network interface logic being located on a call server or a system associated with a callee, the social network interface logic may instead be located on a system associated with a caller, as discussed above with respect to FIG. 3. FIG. 5 is a process flow diagram which illustrates a general method of displaying a social network status message on a dialing phone within a network in which social network interface logic is located on the dialing phone in accordance with an embodiment. A method 501 of displaying a social network status message begins at step 501 in which a phone number that is being dialed by a caller is identified as being associated with a callee during a calling or, more specifically, a dialing process. The phone number may be recognized as it is being dialed, or a phone number may be substantially identified when a corresponding speed dial button is selected. Identifying a phone number as being associated with a callee may include, but is not limited to including, accessing a mapping that maps the phone number to a callee and/or various user identifiers (userids) which identify the callee with respect to social network sites. Such a mapping may be stored locally on the dialing phone, or may be stored externally and accessed by the dialing phone. It should be appreciated that such a mapping may be performed, in one embodiment, by an external process such as a web service.

Once the phone number being dialed is identified as being associated with the callee, it is determined in step 509 whether the callee permits the caller to access the status of the callee. That is, a determination is made as to whether the caller is authorized to access status information associated with the callee. Such a determination may be made by a database located on the callee's phone, on the call server, or using rules established and maintained on the social networking sites to which the callee subscribes. If the determination in step 509 is that the caller does not have permission or authorization to access the status of the callee, then the status of the callee is not displayed to the caller in step 513. In one embodiment, an indication that the caller does not have permission to access status information pertaining to the callee may be displayed to the caller. Then, in step 517, the calling process continues, e.g., a connection is made to a call server and the callee, and the method of displaying a social network status message is completed.

Alternatively, if it is determined in step 509 that the caller has permission to access the status of the callee, the indication is that the caller has permission to access status information of the callee on at least one social network site. Accordingly, in step 521, substantially all available statuses of the callee are obtained, e.g., from social network sites. Available statuses may generally be any statuses that the caller has permission to access. It should be appreciated that there may be no available statuses, e.g., if the callee has not provided updated status information within a particular time period. Obtaining available statuses may include obtaining the status through network connections, e.g., in an SMS message provided by a social network site.

Upon obtaining substantially all available statuses of the callee, it is determined in step 521 whether there are any statuses of the callee that are available, or have been successfully obtained. If the determination is that no statuses of the callee are available, the indication is that there is no status of the callee that may be displayed. As such, process flow moves from step 521 to step 513 in which no status of a callee is displayed.

Alternatively, if it is determined in step 521 that there is at least one status of a callee that is available, then an appropriate status of the callee to display is determined in step 525. Determining an appropriate status of a callee may include, but is not limited to including, assessing the age or evaluating the recency of available statuses and analyzing the words contained in the available statuses. Policies applied to determine an appropriate status to display may vary widely and may, for example, result in the appropriate status being a most recent status or a most relevant status.

After an appropriate status of a callee is determined, the appropriate status of the callee is displayed in step 529. The method of displaying a social network status message is completed once the appropriate status is displayed.

Figure 6:
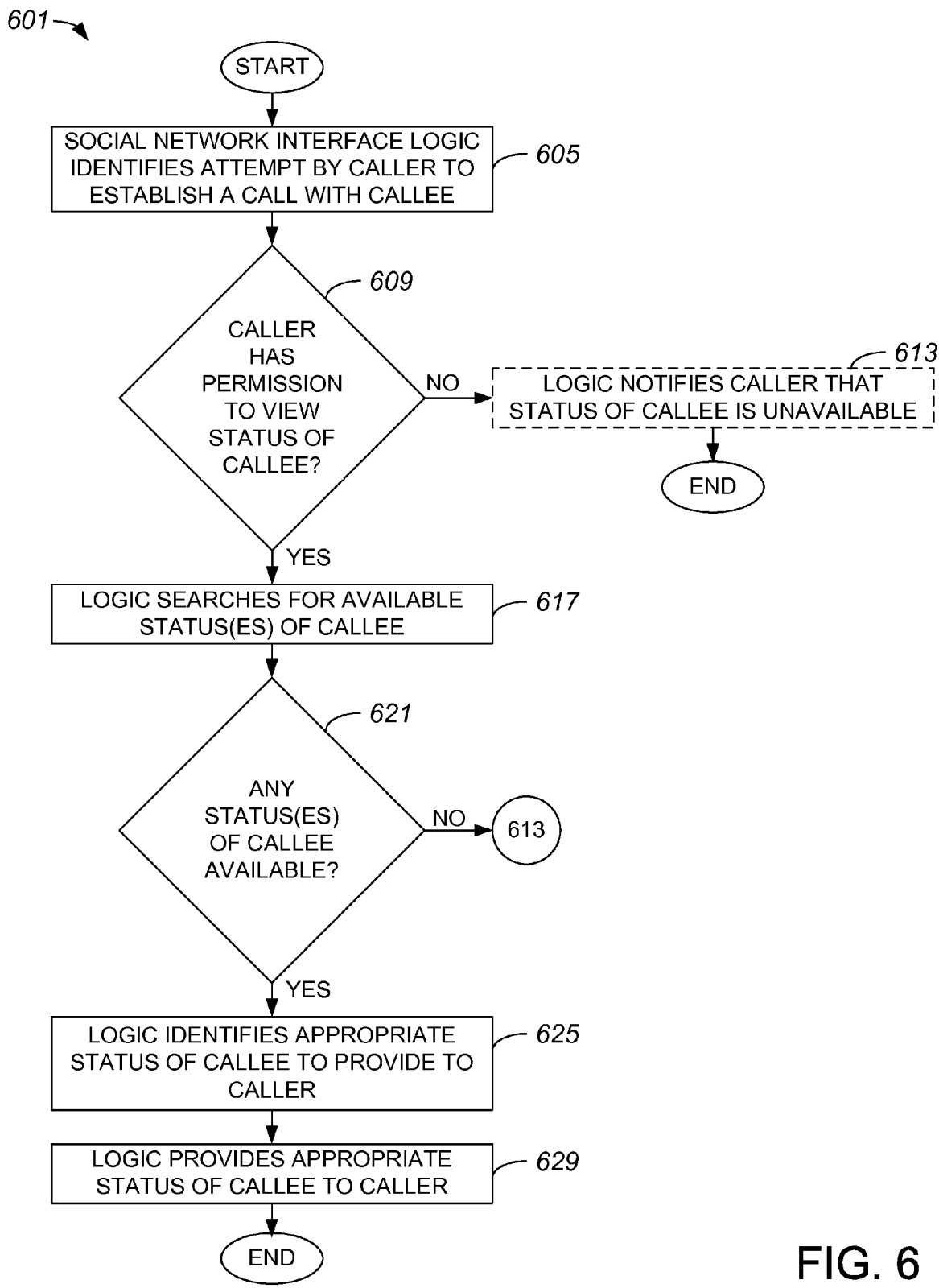
FIG. 6 is a process flow diagram which illustrates a method of operating social network interface logic in accordance with an embodiment.

Referring next to FIG. 6, a method of operating social network interface logic will be described in accordance with an embodiment. A method 601 of operating social network interface logic begins at step 605 in which social network interface logic identifies an attempt by a caller to establish a call with a callee. It should be appreciated that the social network interface logic may be located on a caller system, a callee system, or a call server. Once an attempt to establish a call with a callee is identified, a determination is made in step 609 as to whether the caller has permission to view the status of the callee. If it is determined that the caller does not have permission to view the status of the callee, the logic optionally notifies the caller in step 613 that the status of the callee is unavailable, and the method of operating software network interface logic is completed.

Alternatively, if it is determined in step 609 that the caller has permission to view the status of the callee, the logic searches for available statuses of the callee in step 617. Such a search may include, but is not limited to including, accessing social network sites, databases in which status information is maintained, and/or local caches in which status information is maintained.

After the logic searches for available statuses of the callee, it is determined in step 621 whether there is at least one status of the callee that is available. If it is determined that there are no available statuses of the callee that are available, then process flow proceeds to step 613 in which the logic optionally notifies the caller that the status of the callee is unavailable. On the other hand, if it is determined that there is at least one status of the callee that is available, the logic identifies an appropriate status of the callee to provide to the caller in step 625. The logic then provides the appropriate status of the callee to the caller in step 629, and the method of operating social network interface logic is completed.

Figure 7:
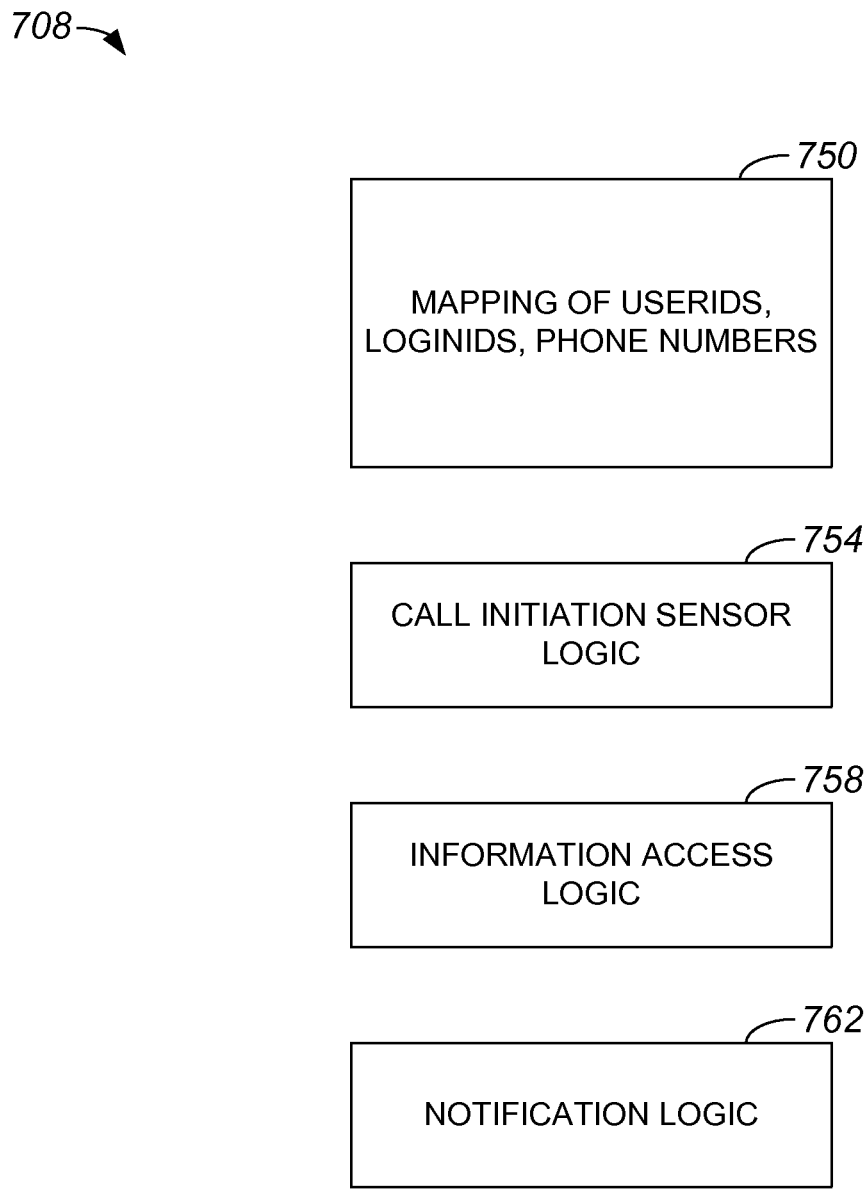
FIG. 7 is a diagrammatic representation of a social networking interface module, e.g., software network interface logic, in accordance with an embodiment.

FIG. 7 is a diagrammatic representation of a social network interface module, e.g., software network interface logic, in accordance with an embodiment. A social network interface module 708 may include hardware and/or software components, e.g., logic components. In one embodiment, social network interface module 708 includes a mapping 750 of userids, login identifiers (loginids) and/or phone numbers to various parties. That is, mapping 750 maintains information which allows userids, loginids, and/or phone numbers to be associated with their owners. It should be appreciated that such a mapping may instead be maintained externally to social network interface module 708, and may be accessed by social network interface module 708.

Social network interface module 708 also includes call initiation sensor logic 743, information access logic 758, and notification logic 762. Call initiation sensor logic 754 is arranged to determine when a call has been initiated by a caller. When social network interface module 708 is embodied with respect to a system of the caller, call initiation sensor logic 754 may effectively sense when a call is being dialed, e.g., prior to a connection being made to a call server. Alternatively, when social network interface module 708 is embodied with respect to either a call server or a system associated with a callee, social network interface module 708 may effectively sense when a connection to the call server or the system associated with the callee, respectively, has been made. Information access logic 758 is arranged to access status information, and may be configured to access social network sites and/or caches, e.g., local caches, in which status information may be maintained. Notification logic 752 is generally arranged to provide a notification that includes status information relating to a callee. Notification logic 752 may also be configured to provide a notification which specifies that status information relating to a callee is unavailable, as for example because a callee is not authorized to access the status information or because no status information has been located.

Figure 8:
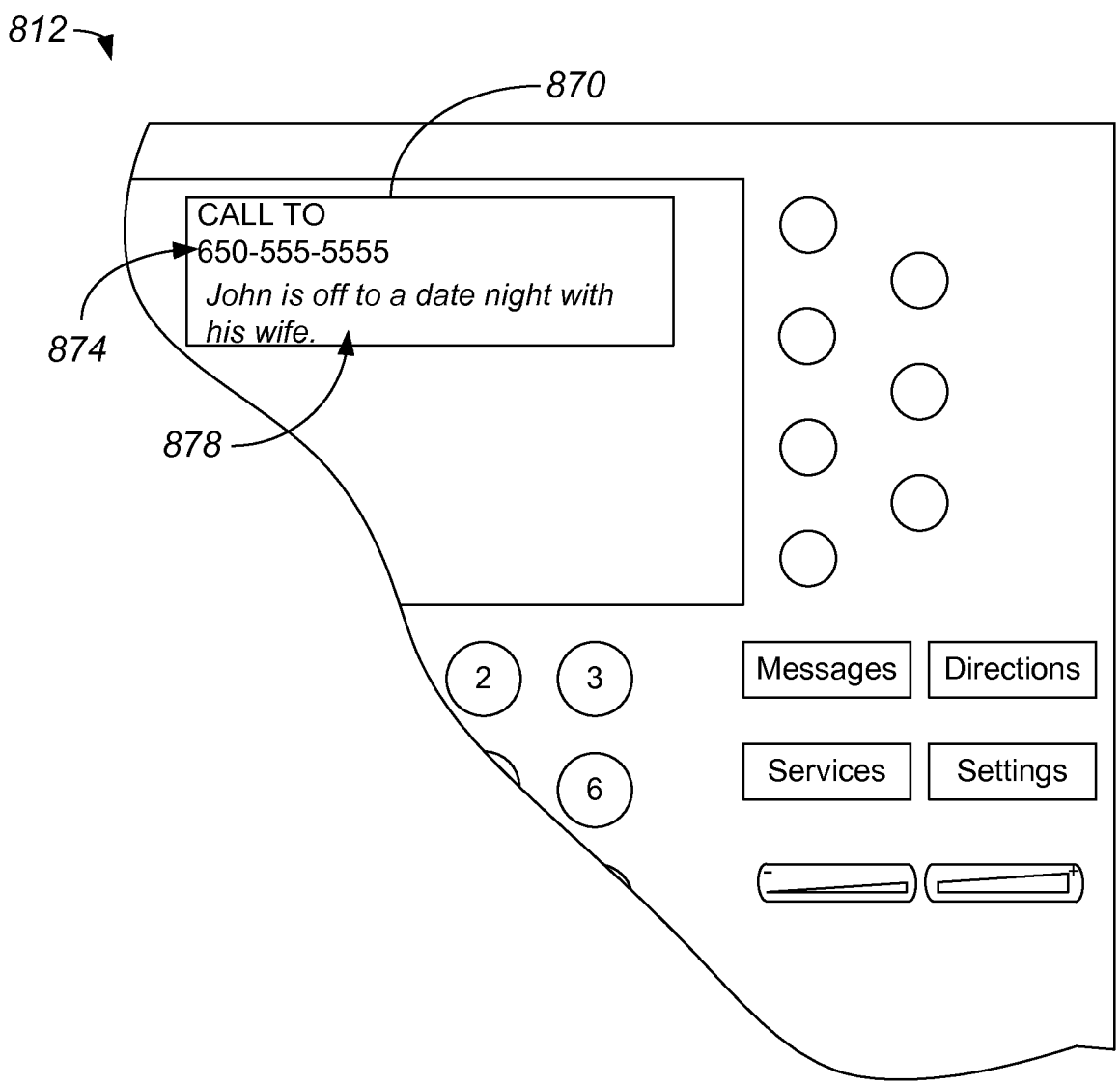
FIG. 8 is a diagrammatic representation of a display screen associated with a telephone that displays a status of a callee in accordance with an embodiment.

As previously mentioned, a caller may be associated with a telephone or a device, e.g., a computer system, that includes telephonic capabilities. The telephone or device that includes telephonic capabilities includes a display screen, in one embodiment, on which status information associated with a callee may be displayed. FIG. 8 is a diagrammatic representation of a display screen associated with a telephone that displays a status of a callee in accordance with an embodiment. A telephone or, more generally, a callee device 812 includes a display screen 870. In one embodiment, display screen 870 displays information 874 relating to a callee and a status 878 relating to the callee. Information 874 relating to a callee may include, but is not limited to including, a dialed phone number of the callee.

Although only a few embodiments have been described in this disclosure, it should be understood that the disclosure may be embodied in many other specific forms without departing from the spirit or the scope of the present disclosure. By way of example, although social network status information relating to a callee has been described as being displayed to a caller, the social network status information is not limited to being displayed to a caller. Social network status information may be presented or otherwise provided to a caller in any suitable manner including, but not limited to including, providing an audio version of the social network status information to the caller.

Status information other than social network status information may be provided to a caller. In other words, substantially any status information associated with a callee may be provided to a caller. Such status information may include an indication of the last time that a callee updated his or status, any lapse in frequency of updates, and/or status of friends on the callee on a web site which may be deemed to be important. For example, if a wife identified in a callee's profile on a web site has a status update of "date night with husband," that status update may be provided to a caller.

Social network interface logic has been described as being included on a caller system, a call server, or a callee system. It should be appreciated, however, that social network interface logic may be included on any or all of a caller system, a call server, and a callee system. In one embodiment, when multiple systems include social network interface logic, the social network interface logic may be arranged to cooperate such that status information may be obtained and provided to a caller in the most efficient manner.

The functionality associated with social network interface logic may be distributed without departing from the spirit or the scope of the disclosure. By way of example, if a caller system, a call server, and a callee system each include social network interface logic, the social network interface logic may be arranged such that each of the systems provides different functionality relating to providing status information to the caller system.

Metrics or policies used to select an appropriate status of a callee may vary widely. Policies may, for example, be keyword-based and/or time-based. For instance, if the most recent status of a callee is "John is having lunch with his wife," and the current time is 4 pm, then a policy used to select an appropriate status may determine that "John is having lunch" is not appropriate to provide to a caller at 4 pm. A previous status, e.g., "John is looking forward to visiting San Jose," may be deemed to be a more appropriate status to provide to a caller at 4 pm although "John is having lunch" may be a more recent status. As many social networking sites have different levels of permissions, it should be appreciated that such permissions can also apply to the social networking status made available. A callee may wish to have an extended status made available to his or her direct family, while a co-worker or a boss may only be privy to an abbreviated status which is run through a filter or even chosen by the callee.

While logic that is configure to provide status aggregation has generally been described as being present on a phone or a call server, it should be appreciated that status aggregation is not limited to being performed by logic on a phone or a call server. By way of example, status aggregation may be performed on the web and may be obtained from the web by a phone and/or a call server.

The embodiments may be implemented as hardware and/or software logic embodied in a physical, tangible medium that is operable to perform the various methods and processes described above. That is, the logic may be embodied as and/or in physical arrangements, physical configurations, physical modules, or physical components. A tangible medium may be substantially any computer-program product or computer-readable medium that is capable of storing logic which may be executed, e.g., by a processor associated with a computing system, to perform methods and functions associated with the embodiments. In other words, logic stored on a computer-readable medium is operable to perform the methods and the functions associated with the embodiments when the logic is executed by a processor. Such computer-readable mediums may include, but are not limited to including, physical storage devices, memory devices, and databases. Executable logic may include code devices, computer program code, and/or executable computer commands or instructions. A processor may be included in a callee system, a caller system, and/or a call server.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
identifying when a call to a callee has been initiated by a system;
obtaining status information associated with the callee when the call is identified as being initiated, wherein obtaining the status information associated with the callee includes identifying a caller associated with the system and determining whether the caller is authorized to access the status information, the status information being obtained when the caller is authorized to access the status information, and wherein the status information includes a first status and a second status;
determining whether to display the first status or the second status on the system, wherein determining whether to display the first status or the second status on the system includes applying a policy to determine whether to display the first status or the second status, the policy being at least one selected from the group including a time-based metric and a keyword-based metric, and wherein the policy is a time-based metric and determining whether to display the first status or the second status includes determining whether the first status is more recent than the second status; and
displaying the status information on the system.

2. The method of claim 1 wherein obtaining the status information associated with the callee includes obtaining the first status from a first site and obtaining the second status from a second site.

3. The method of claim 1 wherein when it is determined that the first status is more recent than the second status, displaying the status information on the system includes displaying the first status on the system.

4. The method of claim 1 wherein the status information is social network status information, and obtaining the status information includes obtaining the social network status information from the callee.

5. The method of claim 1 further including:
providing the status information to the system.

6. The method of claim 5 wherein providing the status information to the system includes providing the status information in an SMS message.

7. The method of claim 1 wherein the system is a phone system, the phone system including a display screen, and wherein displaying the status information on the system includes displaying the status information on the display screen.

8. A non-transitory computer-readable medium comprising computer program code, the computer program code, when executed, configured to:
identify when a call to a callee has been initiated by a system;
obtain status information associated with the callee when the call is identified as being initiated, wherein the computer program code configured to obtain the status information associated with the callee is configured to identify a caller associated with the system and to determine whether the caller is authorized to access the status information, the status information being obtained when the caller is authorized to access the status information, and wherein the status information includes a first status and a second status;
determine whether to display the first status or the second status on the system, wherein the computer program code configured to determine whether to display the first status or the second status on the system is configured to apply a policy to determine whether to display the first status or the second status, the policy being at least one selected from the group including a time-based metric and a keyword-based metric, and wherein the policy is a time-based metric and the computer program code configured to determine whether to display the first status or the second status is configured to determine whether the first status is more recent than the second status; and
display the status information on the system.

9. The non-transitory computer-readable medium of claim 8 wherein the computer program code configured to obtain the status information associated with the callee is configured to obtain the first status from a first site and to obtain the second status from a second site.

10. The non-transitory computer-readable medium of claim 8 wherein when it is determined that the first status is more recent than the second status, the computer program code configured to display the status information on the system is configured to display the first status on the system.

11. The non-transitory computer-readable medium of claim 8 wherein the status information is social network status information, and the computer program code configured to obtain the status information is configured to obtain the social network status information from the callee.

12. The non-transitory computer-readable medium of claim 8 further including computer program code configured to:
provide the status information to the system.

13. The non-transitory computer-readable medium of claim 12 wherein the computer program code configured to provide the status information to the system is configured to provide the status information in an SMS message.

14. The non-transitory computer-readable medium of claim 8 wherein the system is a phone system, the phone system including a display screen, and wherein the computer program code configured to display the status information on the system is configured to display the status information on the display screen.

* * * * *